United States Patent
Kong et al.

(10) Patent No.: US 9,992,050 B2
(45) Date of Patent: Jun. 5, 2018

(54) SYSTEM AND APPARATUS AND ASSOCIATED METHODS FOR MULTIPLE CHANNEL SIGNAL GENERATING AND ANALYZING WITH WIDE BANDWIDTH

(71) Applicant: Keysight Technologies, Inc., Minneapolis, MN (US)

(72) Inventors: Hong-Wei Kong, Beijing (CN); Ya Jing, Beijing (CN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days. days.

(21) Appl. No.: 15/388,526

(22) Filed: Dec. 22, 2016

(65) Prior Publication Data
US 2017/0180175 A1     Jun. 22, 2017

(30) Foreign Application Priority Data
Dec. 22, 2015  (CN) .......................... 2015 1 0968880

(51) Int. Cl.
| | |
|---|---|
| *H04L 27/26* | (2006.01) |
| *H04B 7/0413* | (2017.01) |
| *H04B 7/06* | (2006.01) |
| *H04L 7/00* | (2006.01) |
| *H04L 7/04* | (2006.01) |
| *H04L 27/227* | (2006.01) |

(Continued)

(52) U.S. Cl.
CPC ....... *H04L 27/2602* (2013.01); *H04B 7/0413* (2013.01); *H04B 7/06* (2013.01); *H04L 7/0091* (2013.01); *H04L 7/04* (2013.01); *H04L 27/227* (2013.01); *H04L 27/3818* (2013.01); *H04L 2027/0016* (2013.01); *H04L 2027/0024* (2013.01)

(58) Field of Classification Search
CPC .. H04B 1/525; H04B 7/0413; H04B 10/2581; H04B 7/0408; H04B 7/0417; H04B 17/12; H04B 7/12; H04L 27/2601
USPC ........ 375/267, 299, 347–349, 354, 356, 358
See application file for complete search history.

(56) References Cited

U.S. PATENT DOCUMENTS

| | | | | |
|---|---|---|---|---|
| 3,553,693 A | * | 1/1971 | Lockerd et al. ......... | H01Q 3/34 342/371 |
| 5,396,489 A | * | 3/1995 | Harrison ................. | H04J 4/005 370/210 |

(Continued)

OTHER PUBLICATIONS

Tierney et al., "A Digital Frequency Synthesizer", IEEE Transactions on Audio and Electroacoustics, col. AU-19, No. 1, pp. 48-57, Mar. 1971.

(Continued)

*Primary Examiner* — Emmanuel Bayard

(57) ABSTRACT

The multi-channel signal processing device includes a multi-channel continuous waveform (CW) phase shifter module configured to generate phase control and filter interference therein for multiple local oscillator (LO) signals at a same frequency, a multi-channel up-converter module configured to up-convert the multiple LO signals to a desired frequency and filter respective image signals therein, and a multi-channel wideband mixer module configured to receive and mix the up-converted LO signals at the desired frequency from the multi-channel up-converter module with radio frequency (RF) signals.

20 Claims, 3 Drawing Sheets

(51) Int. Cl.
*H04L 27/38* (2006.01)
*H04L 27/00* (2006.01)

(56) References Cited

U.S. PATENT DOCUMENTS

| | | | | |
|---|---|---|---|---|
| 6,111,911 | A * | 8/2000 | Sanderford, Jr. | H04B 1/707 375/141 |
| 6,226,531 | B1 * | 5/2001 | Holt | H01Q 1/246 342/380 |
| 6,459,404 | B1 | 10/2002 | Nussbaum et al. | |
| 6,466,165 | B2 * | 10/2002 | Obayashi | H01Q 3/2605 342/372 |
| 6,483,817 | B1 * | 11/2002 | Antonio | H04B 1/707 370/328 |
| 7,302,237 | B2 | 11/2007 | Jackson et al. | |
| 7,570,201 | B1 * | 8/2009 | Watkins | G01S 7/4008 342/100 |
| 7,692,507 | B2 | 4/2010 | Nara | |
| 9,172,569 | B2 * | 10/2015 | Leenaerts | H04B 7/0617 |
| 2002/0098842 | A1 * | 7/2002 | Antonio | H04W 36/06 455/442 |
| 2006/0125687 | A1 | 6/2006 | Greeley | |
| 2008/0316955 | A1 * | 12/2008 | Yu | H04W 72/04 370/319 |
| 2011/0115665 | A1 * | 5/2011 | Ryu | H01Q 3/2605 342/21 |

OTHER PUBLICATIONS

Kent et al., "A High Purity, High Speed Direct Digital Synthesizer", IEEE International Frequency Control Symposium, pp. 207-211, 1993.

Zhang et al., "Design and Implementation of Multi-Channel Wideband and RF Signal Generator", 2014 IEEE 17th International Conference on Computational Science and Engineering, p.1566-1569.

* cited by examiner

SYSTEM AND APPARATUS AND ASSOCIATED METHODS FOR MULTIPLE CHANNEL SIGNAL GENERATING AND ANALYZING WITH WIDE BANDWIDTH

CROSS REFERENCE TO RELATED APPLICATIONS

The present application claims priority under 35 U.S.C. § 119(e) from Chinese Patent Application No. 201510968880.6 filed on Dec. 22, 2015 naming Hong-Wei Kong, et al. as inventors. The entire disclosure of Chinese Patent Application No. 201510968880.6 is specifically incorporated herein by reference.

BACKGROUND

For signal beam-forming in radar and wireless communication systems, a multi-channel phase coherent signal generator is needed to generate the multi-channel signals with controlled phase difference and a multi-channel phase coherent signal analyzer is needed to capture the multi-channel signals with controlled phase difference.

Current approaches usually adopt the following methods: 1) Multiple RF phase shift components; 2) Use DDS (Direct Digital Synthesizer) to generate multiple carriers with different phases; and 3) Baseband digital phase shifting.

The disadvantage of the multiple RF phase shift approach is that the phase shifter typically has a limited frequency range. It cannot cover a broad frequency range which is required for 5G applications and the phase control resolution is typically limited.

The advantage using a DDS is that it can support very fine phase adjustment. However, the disadvantage is that it is very challenging to support high carrier frequency by DDS directly, and DDS phase shifting is typically applied to a continuous waveform (CW) signal not a broadband modulated signal. The DDS signal typically suffers from a lot of interference as well. For the baseband digital phase shifting approach, it can generate very fine phase control, support broadband modulated signal and also cover a very wide frequency span depending on the RF up conversion and down conversion capability. However, it requires a whole chain including RF down conversion, digitization, phase adjustment, digital to analog conversion and up conversion etc. to achieve the phase control. It is thus very expensive especially when multi-channel broadband signal generation/analysis capabilities with fine phase control are required for a very wide frequency span.

The use of multiple channel phase coherent instruments and baseband adjustment to generate multi-channel broadband signals and/or capture multi-channel broadband signals with fine phase control is a variety of the third approach and thus share the same advantages and disadvantages.

For a radar test and/or for a 5G massive multiple-in-multiple-out (MIMO) test, for example, a cost effective multi-channel, broad bandwidth signal generation approach which can cover a very wide frequency span is needed.

SUMMARY

The present embodiments address the above-noted need by using a DDS, or other comparable approach, to generate accurate phase control and then using up-conversion circuits and broadband modulation circuits as described below.

In accordance with a representative embodiment, a multi-channel signal processing device includes a multi-channel continuous waveform (CW) phase shifter module configured to generate phase control and filter interference therein for multiple local oscillator (LO) signals at a same frequency, a multi-channel up-converter module configured to up-convert the multiple LO signals to a desired frequency and filter respective image signals therein, and a multi-channel wideband mixer module configured to receive and mix the up-converted LO signals at the desired frequency from the multi-channel up-converter module with radio frequency (RF) signals.

In certain embodiments, the multi-channel signal processing device may further include a wideband RF signal generator configured to provide the RF signals to the multi-channel wideband mixer module.

In certain embodiments, the multi-channel signal processing device may further include an antenna array configured to provide the RF signals to the multi-channel wideband mixer module, and a wideband RF signal analyzer configured to capture the RF signals from the multi-channel wideband mixer module.

In certain embodiments, the multi-channel signal processing device may further include a synchronization module configured to provide the multiple local LO signals to the multi-channel CW phase shifter module.

In certain embodiments, the synchronization module may be further configured to provide a reference clock to the multi-channel CW phase shifter module.

In certain embodiments, the multi-channel signal processing device may further include a control unit configured to control the multi-channel CW phase shifter module, the multi-channel up-converter module, and the multi-channel wideband mixer module.

In certain embodiments, the multi-channel up-converter module comprises multiple stages of up-conversion circuits.

In certain embodiments, the multi-channel CW phase shifter module may include clock amplification and distribution circuitry, a direct digital synthesizer (DDs) array coupled downstream from the clock amplification and distribution circuitry, an attenuator network coupled downstream from the DDS array, a filter network coupled downstream from the attenuator network, and phase and amplitude control circuitry configured to provide control signals to the DDS array and attenuator network.

Another embodiment is directed to a multi-channel signal processing device comprising: a multi-channel continuous waveform (CW) phase shifter module configured to generate phase control and filter interference therein for multiple local oscillator (LO) signals at a same frequency; a multi-channel up-converter module configured to up-convert the multiple LO signals to a desired frequency and filter respective image signals therein; a multi-channel wideband mixer module configured to receive and mix the up-converted LO signals at the desired frequency from the multi-channel up-converter module with radio frequency (RF) signals; a synchronization module configured to provide the multiple local LO signals and a reference clock to the multi-channel CW phase shifter module; and a control unit configured to control the multi-channel CW phase shifter module, the multi-channel up-converter module, and the multi-channel wideband mixer module.

A method aspect is directed to multi-channel signal processing comprising: generating phase control, with a multi-channel continuous waveform (CW) phase shifter module, and filtering interference therein for multiple local oscillator (LO) signals at a same frequency; up-converting the multiple LO signals to a desired frequency, with a multi-channel up-converter module, and filter respective image signals therein; and receiving, at a multi-channel wideband mixer module, and mixing the up-converted LO signals at the desired frequency from the multi-channel conversion module with radio frequency (RF) signals.

In certain embodiments, the RF signals are provided to the multi-channel wideband mixer module with a wideband RF signal generator.

In certain embodiments, the method includes providing the RF signals to the multi-channel wideband mixer module with an antenna array; and capturing the RF signals from the multi-channel wideband mixer module with a wideband RF signal analyzer.

In certain embodiments, the method includes providing the multiple local LO signals to the multi-channel CW phase shifter module with a synchronization module.

In certain embodiments, the method includes providing a reference clock to the multi-channel CW phase shifter module with the synchronization module.

In certain embodiments, the method includes controlling the multi-channel CW phase shifter module, the multi-channel up-converter module, and the multi-channel wideband mixer module with a control unit.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
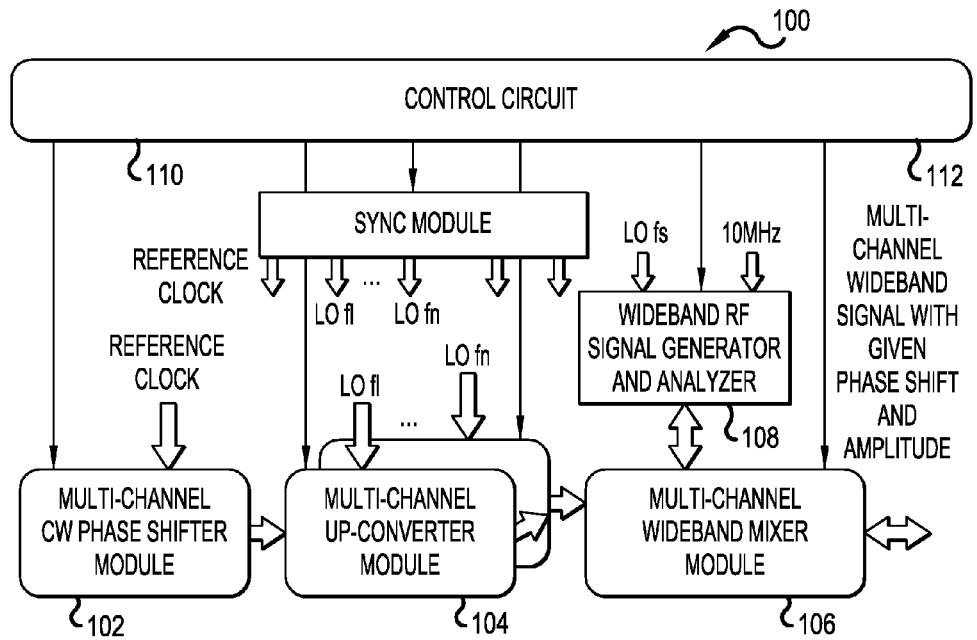
FIG. 1 is a block diagram of a multi-channel signal processing device according to an embodiment.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" another element, it can be directly connected or coupled, or intervening elements may be present.

A 'processor' as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. Many programs have their instructions performed by multiple processors that may be within the same computing device or which may even be distributed across multiple computing devices.

'Computer memory' or 'memory' is an example of a computer-readable storage medium. Computer memory is any memory which is directly accessible to a processor. Examples of computer memory include, but are not limited to: RAM memory, registers, and register files. References to 'computer memory' or 'memory' should be interpreted as possibly being multiple memories. The memory may for instance be multiple memories within the same computer system. The memory may also be multiple memories distributed amongst multiple computer systems or computing devices.

A 'user interface' as used herein is an interface which allows a user or operator to interact with a computer or computer system. A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a touch screen, keyboard, mouse, trackball, touchpad, pointing stick, graphics tablet, joystick, gamepad, webcam, headset, gear sticks, steering wheel, wired glove, wireless remote control, and accelerometer are all examples of user interface components which enable the receiving of information or data from an operator.

A 'hardware interface' as used herein encompasses an interface which enables the processor of a computer system to interact with and/or control an external computing device and/or apparatus. A hardware interface may allow a processor to send control signals or instructions to an external computing device and/or apparatus. A hardware interface may also enable a processor to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

Initially, it is pointed out that some possible advantages of the present embodiments include: high phase adjustment resolution and high phase control linearity because using DDS to generate the phase difference may support sub-degree phase control accuracy and very high phase control linearity; support for broadband modulation with high quality because a broadband instrument is used to generate broadband modulated RF signals with high quality and to capture the received signal after the phase shift network; high frequency coverage with good performance because of using up-conversion circuits for LO signals and very narrow band filters, and the interference of the DDS signal can be effectively suppressed and up converted to get very clean high frequency LO signals; and scalability in terms of cost and number of channels and frequency coverage because the DDS circuits are very low cost, the up-conversion circuits are very cost effective as well because of the narrow bandwidth. The frequency coverage can be scalable as the number of up-conversion steps can be flexible depending on the desired application. The broadband RF signal generation and the RF signal analyzer can be performed at a relative low frequency, which reduces the cost as well.

Direct Digital Synthesizers (DDS) are known in the art, and are described, for example, in "A Digital Frequency Synthesizer," Joseph Tierney et al, IEEE Transactions on Audio and Electroacoustics, Col. AU-19, No. 1, pages 48-57, March 1971; and "A High Purity, High Speed Direct Digital Synthesizer to Gary W. Kent et al, IEEE International Frequency Control Symposium, pages 207-211, 1993.

Current DDSs provide the flexibility to generate both fine frequency selection and the pulse compression modulation for a radar exciter and/or wireless communication systems.

Referring initially to FIG. 1, a representative embodiment of a multi-channel signal processing device 100 according to a first embodiment will be described.

The approach uses DDS, or a comparable approach such as an analog delay line, for example, to generate accurate phase control for multiple local oscillator (LO) signals at the same frequency and uses narrow band filtering to filter out the interference due to the DDS or equivalent approach to get clean LO signals. This part is referred to as a multi-channel continuous waveform (CW) phase shifter module 102. The LO signals are up converted to the desired frequency by using multiple stages of up-conversion circuits depending on the frequency needed. For each stage of up conversion, narrow band filtering is applied to remove the image signals. This part is referred to as a multi-channel up-converter module 104.

The multi-channel wideband mixer module 106 may have different architecture for the transmitter side and the receiver side. The wideband radiofrequency (RF) signal generator/analyzer 108 used in the transmitter side may be an RF signal generator instrument with high performance or comparable device. The wideband RF signal generator/analyzer 108 used in the receiver side may be an RF signal analyzer instrument with high performance or comparable device.

For the multi-channel signal generation (i.e. transmission mode), the clean LO signals at the correct frequency are mixed with the RF signals from the wideband rf signal generator/analyzer 108 and filtered to get the multi-channel broadband signals with desired phase and amplitude.

Figure 5:
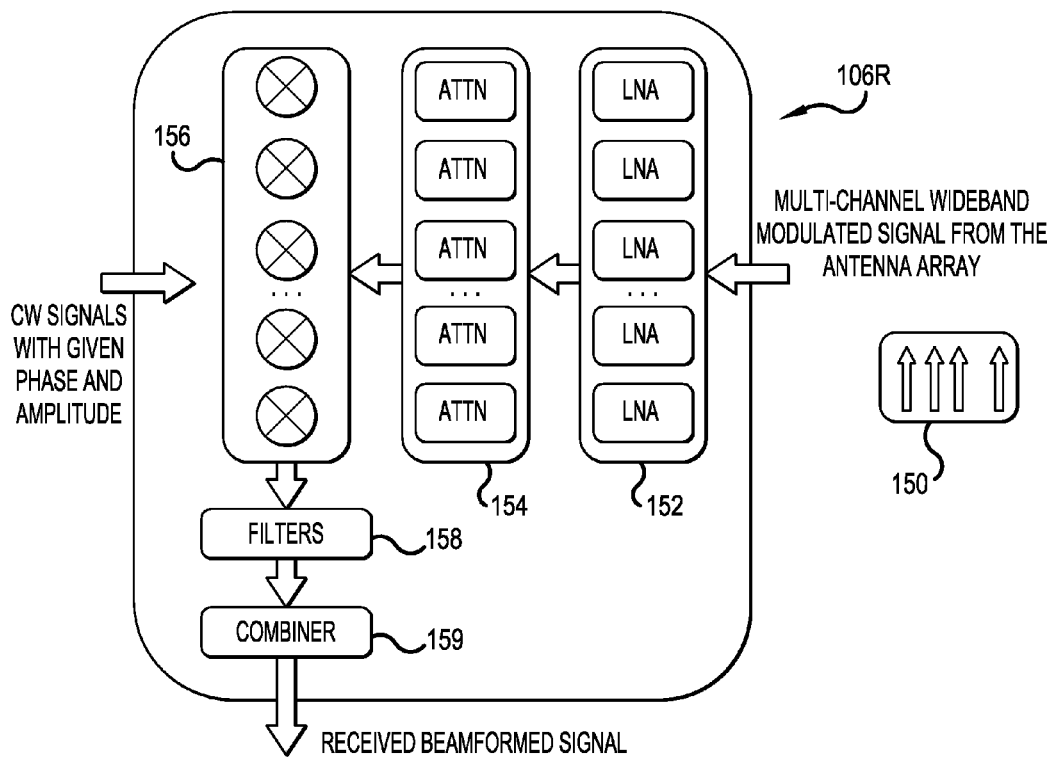
FIG. 5 is a block diagram illustrating a multi-channel wideband mixer module for a receiver embodiment of the multi-channel signal processing device of FIG. 1.

For the multi-channel signal analysis (i.e. receiving mode), the clean LO signals at the right frequency are mixed with the RF signals from an antenna array (FIG. 5) and are filtered and combined. The wideband RF signal generator/analyzer 108 is then used to capture the RF signals after the multi-channel cw phase shifter module 102 (i.e. beamformer).

The multi-channel signal processing device 100 should have good synchronization among different parts and therefore there is a synchronization module 110 to generate the different reference clock and LO signals LOf1-LOfn to be used by the elements discussed above. The multi-channel signal processing device 100 may also have a control unit 112, e.g. including a processor and associated memory, which can program the different elements to adjust the parameters in terms of frequency, signal waveform, phase/amplitude of different channels etc. The various elements may be coupled via a hardware interface and the control unit 112 may be accessed via a user interface and display for selection of various parameters as would be appreciated by those skilled in the art.

To achieve accurate phase and amplitude control for each channel, the multi-channel signal processing device 100 may need to be calibrated. The calibration may use a multiple channel (at least 2 channel) spectrum analyzer to measure the phase and amplitude of each channel, when they are set to have the same initial phase and amplitude, and then adjust the multi-channel CW phase shifter module 102 and also the multiple channel wideband mixer module 106 to make sure the phase and amplitude are the same for all the channels and the amplitude equals the desired amplitude. Once it is calibrated the multi-channel signal processing device 100 should have good repeatability to generate the desired phase and amplitude for the all the channels.

So, in this embodiment, the multi-channel signal processing device 100 includes a multi-channel continuous waveform (CW) phase shifter module 102 configured to generate phase control and filter interference therein for multiple LO signals at a same frequency, a multi-channel up-converter module 104 configured to up-convert the multiple LO signals to a desired frequency and filter respective image signals therein, and a multi-channel wideband mixer module 106 configured to receive and mix the up-converted LO signals at the desired frequency from the multi-channel up-converter module 104 with RF signals.

Figure 2:
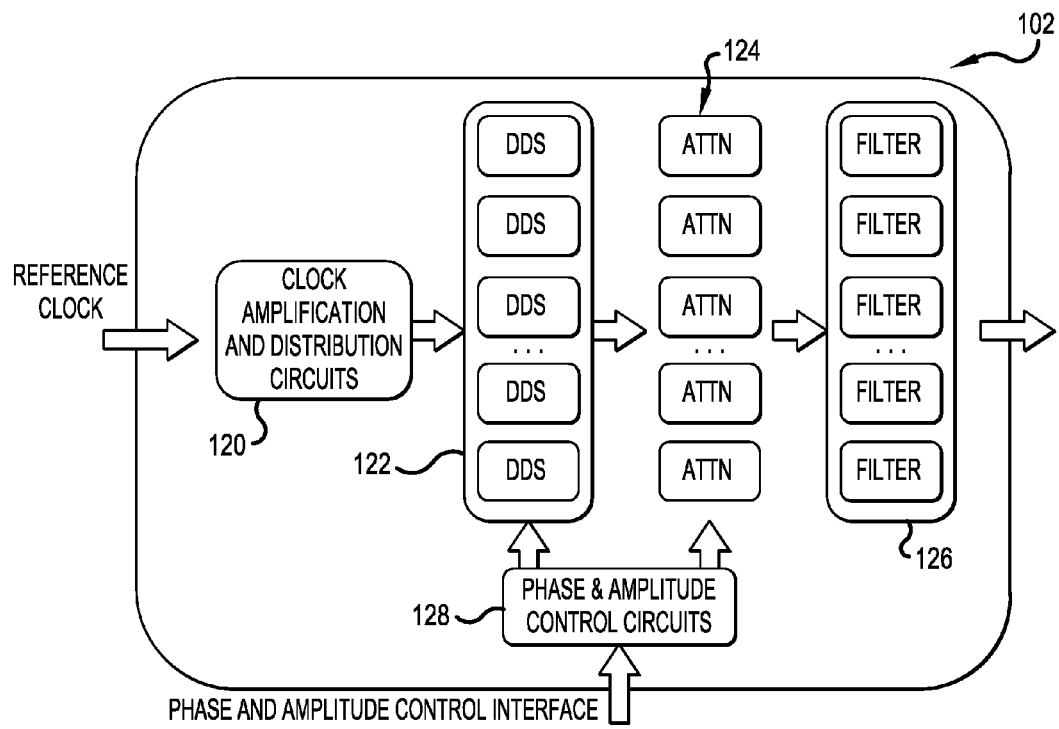
FIG. 2 is a block diagram illustrating a multi-channel phase shifter module of the multi-channel signal processing device of FIG. 1.

With additional reference to FIG. 2, an embodiment of the multi-channel continuous waveform (CW) phase shifter module 102 is described. The multi-channel CW phase shifter module 102 may include clock amplification and distribution circuitry 120, a direct digital synthesizer (DDs) array 122 coupled downstream from the clock amplification and distribution circuitry 120, an attenuator network 124 coupled downstream from the DDS array 122, a filter network 126 coupled downstream from the attenuator network, and phase and amplitude control circuitry 128 configured to provide control signals to the DDS array 122 and attenuator network 124.

Figure 3:
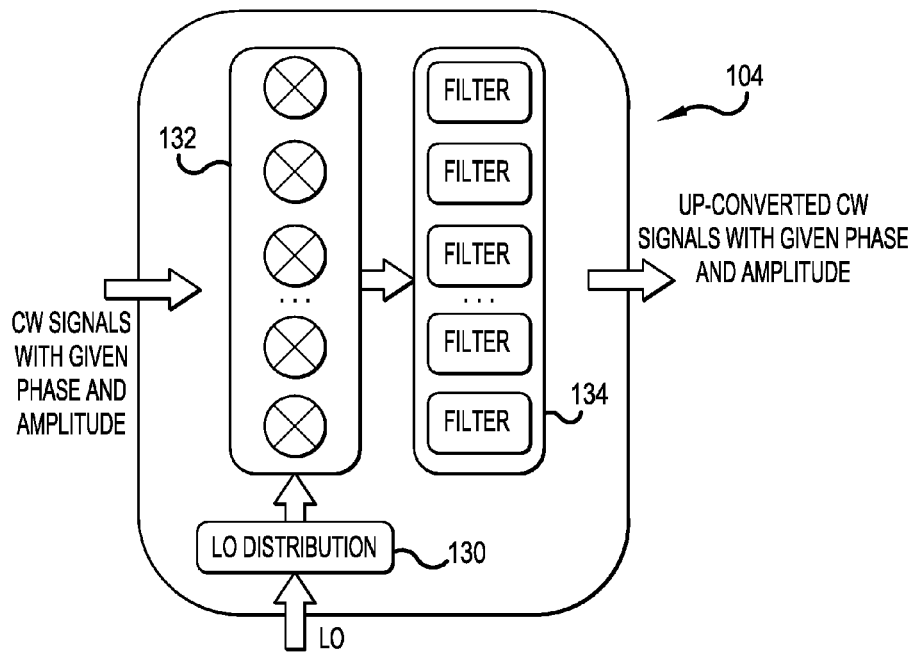
FIG. 3 is a block diagram illustrating a multi-channel up-converter module of the multi-channel signal processing device of FIG. 1.

With additional reference to FIG. 3, an embodiment of the stages of the multi-channel up-converter module 104 is described. The multi-channel up-converter module 104 may include LO distribution circuitry 130 to distribute the LO signals, for example provided by the synchronization module 110, for mixing with the CW signals from the multi-channel CW phase shifter module 102 and up conversion to the desired frequency, for example via a mixer network 132. For each stage of up conversion, a corresponding narrow band filter, for example of the filter network 134, is used to remove the image or noise signal.

Figure 4:
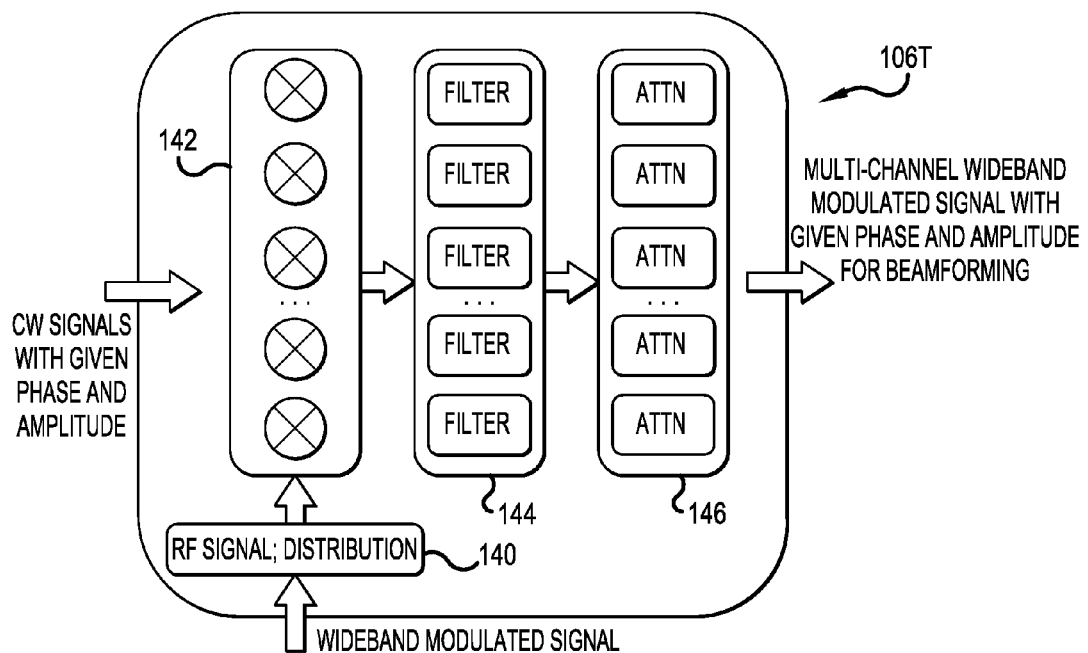
FIG. 4 is a block diagram illustrating a multi-channel wideband mixer module for a transmitter embodiment of the multi-channel signal processing device of FIG. 1.

In a transmitter embodiment (FIG. 4), the multi-channel signal processing device 100 includes the wideband RF signal generator/analyzer 108 configured to provide the RF signals to a multi-channel wideband mixer module 106T. Here, the multi-channel wideband mixer module 106T may include RF signal distribution circuitry 140 to distribute the RF signals from the wideband RF signal generator/analyzer 108 to the mixer network 142 which receives the clean LO signals from the multi-channel up-converter module 104. The clean LO signals at the right frequency are mixed with the RF signals and filtered, via the filter network 144, and attenuated, via the attenuator network 146, to generate the multi-channel broadband signals with desired phase and amplitude for beamforming.

In a receiver embodiment (FIG. 5), the multi-channel signal processing device 100 may further include an antenna array 150 configured to provide the RF signals to a multi-channel wideband mixer module 106R. For example, a multi-channel wideband modulated signal from the antenna array 150 is provided to a low noise amplifier network 152, then attenuated via the attenuator network 154 before mixing, via mixer network 156, with the clean LO signals at the right frequency to result in the received beamformed signal. Again, the wideband RF signal generator/analyzer 108 is configured to capture the RF signals from the multi-channel wideband mixer module 106R, for example, after filtering 158 and combining 159.

As discussed, the multi-channel signal processing device 100 may further include the synchronization module 110 configured to provide the multiple local LO signals LOf1-LOfn to the multi-channel CW phase shifter module 102. The synchronization module 110 may be further configured to provide a reference clock to the multi-channel CW phase shifter module 102 and other elements. The control unit 112 is configured to control the multi-channel CW phase shifter module 102, the multi-channel up-converter module 104, and the multi-channel wideband mixer module 106.

In certain embodiments, the multi-channel up-converter module 104 comprises multiple stages of up-conversion circuits, as illustrated in FIG. 1. For example, each stage may correspond to a desired LO signal LOf1-LOfn.

Figure 6:
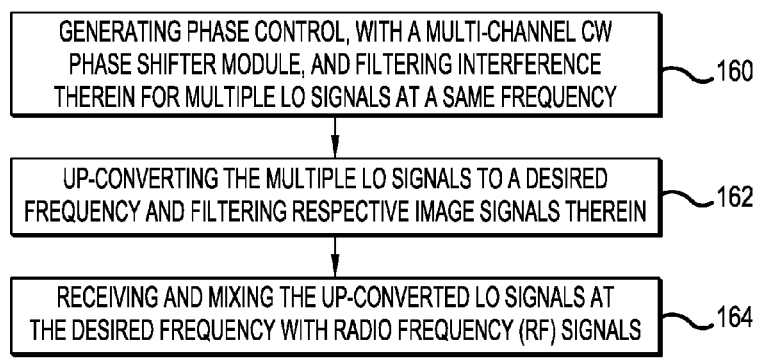
FIG. 6 is a flowchart illustrating various method steps for multi-channel signal processing in accordance with features of the present embodiments.

FIG. 6 is a flowchart of a method using the approach discussed above. The method aspect is directed to multi-channel signal processing and includes generating phase control, with a multi-channel continuous waveform (CW) phase shifter module 102, and filtering interference therein for multiple local oscillator (LO) signals at a same frequency (block 160). The method continues with up-converting the multiple LO signals to a desired frequency, with a multi-channel up-converter module 104, and filter respective image signals therein (block 162), and receiving, at a multi-channel wideband mixer module 106, and mixing the up-converted LO signals at the desired frequency from the multi-channel up-converter module 104 with radio frequency (RF) signals (block 164).

In certain embodiments, the RF signals are provided to the multi-channel wideband mixer module 106T with a wideband RF signal generator/analyzer 108.

In certain embodiments, the method includes providing the RF signals to the multi-channel wideband mixer module 106R with an antenna array 150, and capturing the RF signals from the multi-channel wideband mixer module 106R with the wideband RF signal generator/analyzer 108.

In certain embodiments, the method includes providing the multiple local LO signals to the multi-channel CW phase shifter module 102 with a synchronization module 110. In certain embodiments, the method includes providing a reference clock to the multi-channel CW phase shifter module 102 with the synchronization module 110. In certain embodiments, the method includes controlling the multi-channel CW phase shifter module 102, the multi-channel up-converter module 104, and the multi-channel wideband mixer module 106 with a control unit.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems, for example, as discussed above.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A multi-channel signal processing device comprising:
   a multi-channel continuous waveform (CW) phase shifter module configured to generate phase control and filter interference therein for multiple local oscillator (LO) signals at a same frequency;
   a multi-channel up-converter module configured to up-convert the multiple LO signals to a desired frequency and filter respective image signals therein; and
   a multi-channel wideband mixer module configured to receive and mix the up-converted LO signals at the desired frequency from the multi-channel up-converter module with radio frequency (RF) signals.

2. The multi-channel signal processing device according to claim 1, further comprising a wideband RF signal generator configured to provide the RF signals to the multi-channel wideband mixer module.

3. The multi-channel signal processing device according to claim 1, further comprising:
   an antenna array configured to provide the RF signals to the multi-channel wideband mixer module; and a wideband RF signal analyzer configured to capture the RF signals from the multi-channel wideband mixer module.

4. The multi-channel signal processing device according to claim 1, further comprising a synchronization module configured to provide the multiple local LO signals to the multi-channel CW phase shifter module.

5. The multi-channel signal processing device according to claim 4, wherein the synchronization module is further configured to provide a reference clock to the multi-channel CW phase shifter module.

6. The multi-channel signal processing device according to claim 1, further comprising a control unit configured to control the multi-channel CW phase shifter module, the multi-channel up-converter module, and the multi-channel wideband mixer module.

7. The multi-channel signal processing device according to claim 1, wherein the multi-channel up-converter module comprises multiple stages of up-conversion circuits.

8. The multi-channel signal processing device according to claim 1, wherein the multi-channel CW phase shifter module comprises:
clock amplification and distribution circuitry;
a direct digital synthesizer (DDs) array coupled downstream from the clock amplification and distribution circuitry;
an attenuator network coupled downstream from the DDS array;
a filter network coupled downstream from the attenuator network; and
phase and amplitude control circuitry configured to provide control signals to the DDS array and attenuator network.

9. A multi-channel signal processing device comprising:
a multi-channel continuous waveform (CW) phase shifter module configured to generate phase control and filter interference therein for multiple local oscillator (LO) signals at a same frequency;
a multi-channel up-converter module configured to up-convert the multiple LO signals to a desired frequency and filter respective image signals therein;
a multi-channel wideband mixer module configured to receive and mix the up-converted LO signals at the desired frequency from the multi-channel up-converter module with radio frequency (RF) signals;
a synchronization module configured to provide the multiple local LO signals and a reference clock to the multi-channel CW phase shifter module; and
a control unit configured to control the multi-channel CW phase shifter module, the multi-channel up-converter module, and the multi-channel wideband mixer module.

10. The multi-channel signal processing device according to claim 9, further comprising a wideband RF signal generator configured to provide the RF signals to the multi-channel wideband mixer module.

11. The multi-channel signal processing device according to claim 9, further comprising:

an antenna array configured to provide the RF signals to the multi-channel wideband mixer module; and
a wideband RF signal analyzer configured to capture the RF signals from the multi-channel wideband mixer module.

12. The multi-channel signal processing device according to claim 9, wherein the multi-channel up-converter module comprises multiple stages of up-conversion circuits.

13. The multi-channel signal processing device according to claim 9, wherein the multi-channel CW phase shifter module comprises:
clock amplification and distribution circuitry;
a direct digital synthesizer (DDs) array coupled downstream from the clock amplification and distribution circuitry;
an attenuator network coupled downstream from the DDS array;
a filter network coupled downstream from the attenuator network; and
phase and amplitude control circuitry configured to provide control signals to the DDS array and attenuator network.

14. A method of multi-channel signal processing comprising:
generating phase control, with a multi-channel continuous waveform (CW) phase shifter module, and filtering interference therein for multiple local oscillator (LO) signals at a same frequency;
up-converting the multiple LO signals to a desired frequency, with a multi-channel up-converter module, and filter respective image signals therein; and
receiving, at a multi-channel wideband mixer module, and mixing the up-converted LO signals at the desired frequency from the multi-channel conversion module with radio frequency (RF) signals.

15. The method according to claim 14, wherein the RF signals are provided to the multi-channel wideband mixer module with a wideband RF signal generator.

16. The method according to claim 14, further comprising:
providing the RF signals to the multi-channel wideband mixer module with an antenna array; and
capturing the RF signals from the multi-channel wideband mixer module with a wideband RF signal analyzer.

17. The method according to claim 14, further comprising providing the multiple local LO signals to the multi-channel CW phase shifter module with a synchronization module.

18. The method according to claim 17, further comprising providing a reference clock to the multi-channel CW phase shifter module with the synchronization module.

19. The method according to claim 14, further comprising controlling the multi-channel CW phase shifter module, the multi-channel up-converter module, and the multi-channel wideband mixer module with a control unit.

20. The method according to claim 14, wherein the multi-channel up-converter module comprises multiple stages of up-conversion circuits.

* * * * *